July 14, 1942.   F. TUTTLE ET AL   2,289,812
PHOTOGRAPHIC SLIDE PROJECTOR
Filed Aug. 2, 1940   4 Sheets-Sheet 1

FORDYCE TUTTLE
ALBERT B. FULLER
INVENTORS

BY
ATTORNEYS

July 14, 1942.	F. TUTTLE ET AL	2,289,812
PHOTOGRAPHIC SLIDE PROJECTOR
Filed Aug. 2, 1940	4 Sheets-Sheet 2
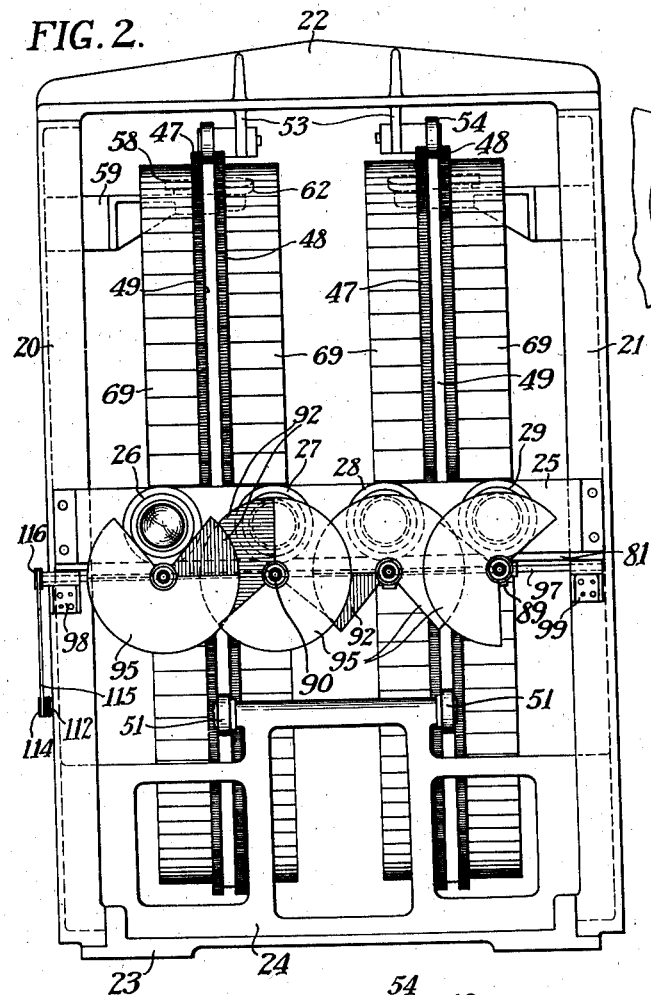
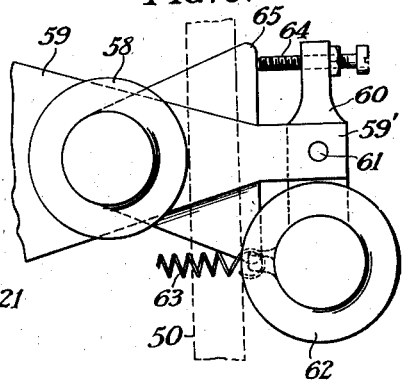
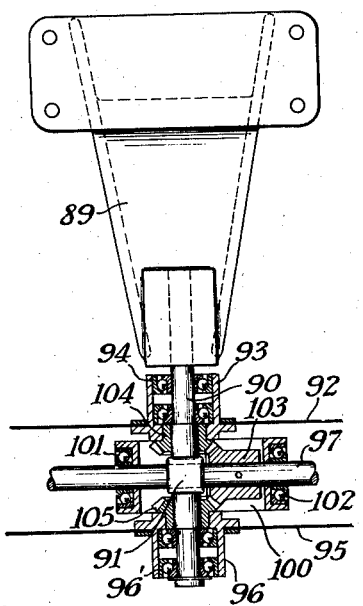
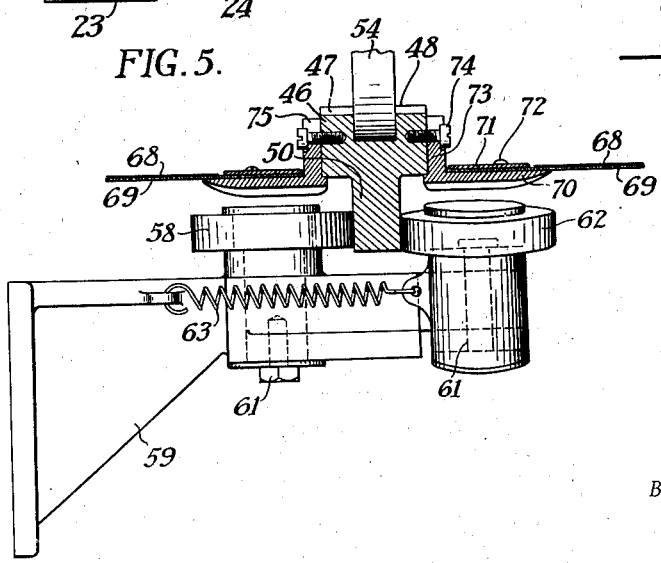
FORDYCE TUTTLE
ALBERT B. FULLER
INVENTORS
BY
ATTORNEYS

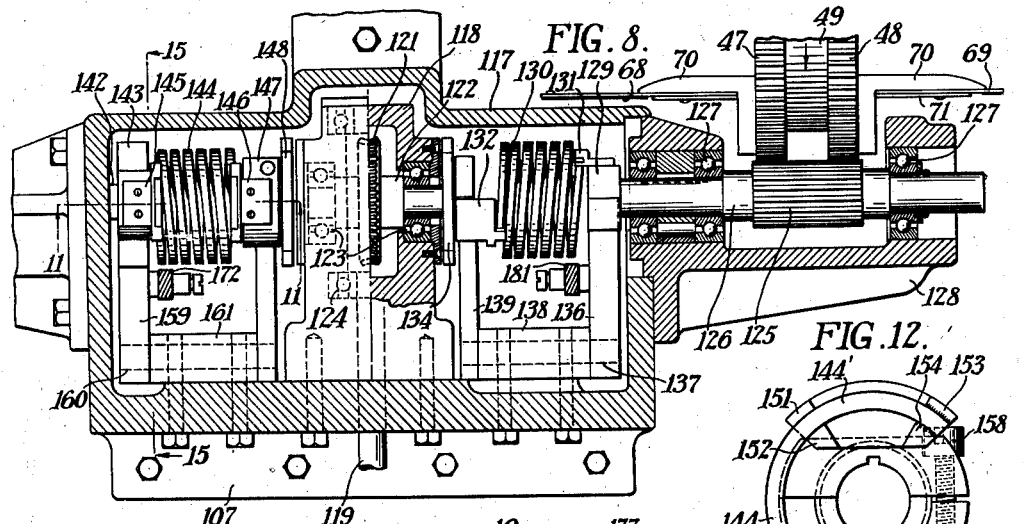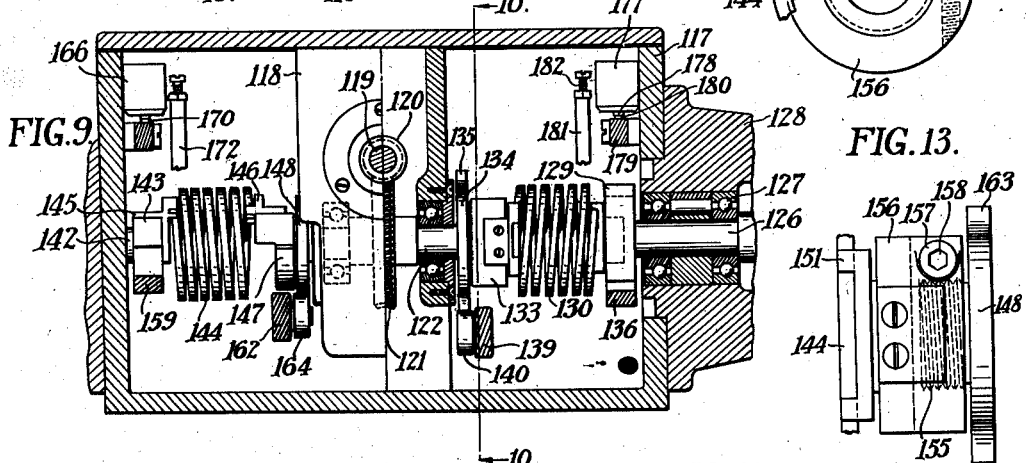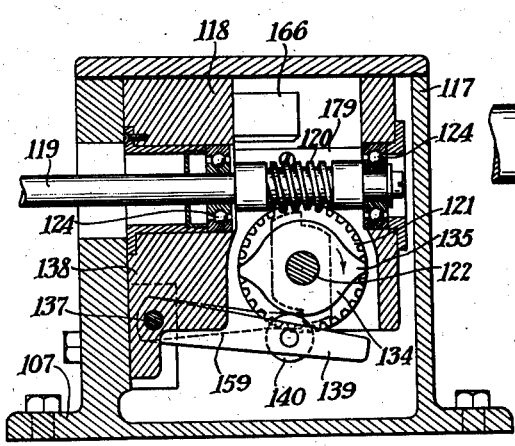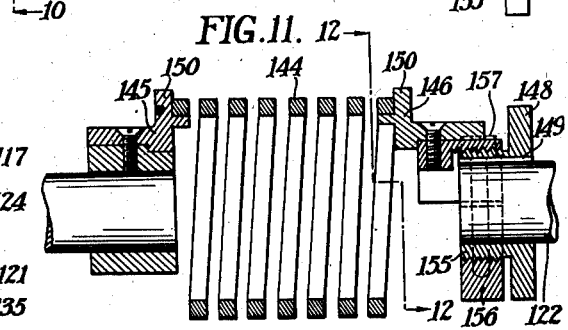
FORDYCE TUTTLE
ALBERT B. FULLER
INVENTORS

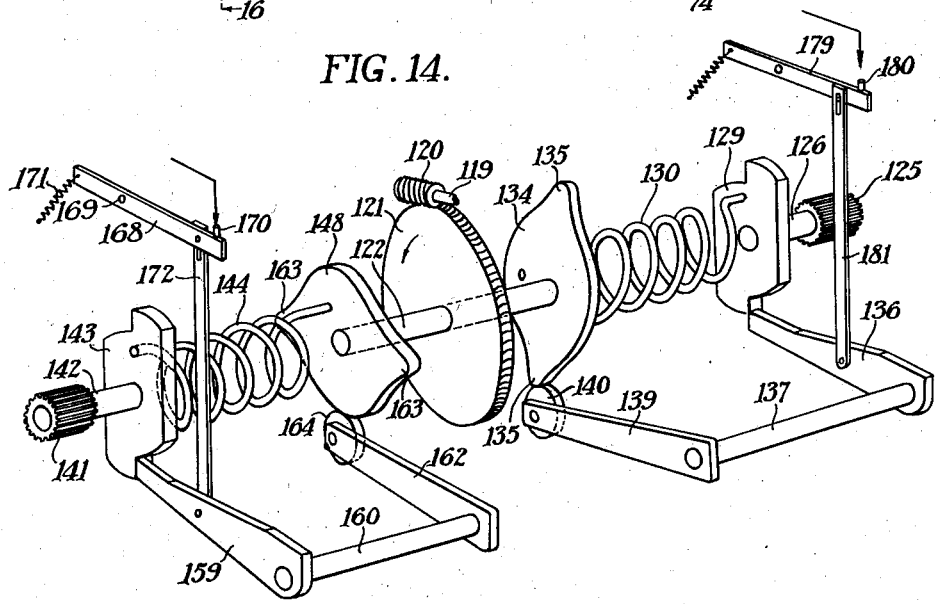

Patented July 14, 1942

2,289,812

UNITED STATES PATENT OFFICE 2,289,812

PHOTOGRAPHIC SLIDE PROJECTOR

Fordyce Tuttle and Albert B. Fuller, Rochester, N. Y., assignors to Eastman Kodak Company, Rochester, N. Y., a corporation of New Jersey Application August 2, 1940, Serial No. 350,005

20 Claims. (Cl. 88—27)

The present invention relates to a photographic slide projector and more particularly to improvements in the image carrier and indexing assembly of the photographic projector disclosed in our copending application, Serial No. 350,004, filed August 2, 1940, for Photographic projector.

The primary object of the present invention is the provision of a pair of indexing assemblies for intermittently moving a pair of image carriers and each including a spring member which is tensioned for movement of the image carrier, which is oppositely tensioned to bring the image carrier to rest, and which transfers the energy of such opposite tensioning to the other spring member of the other indexing assembly.

A further object of the invention is the provision of an image carrier comprising a ring member having integral peripheral gear teeth and for carrying one or two series of each elements located in precise predetermined relation to said teeth.

Still another object of the invention is the provision of a circular image carrier having integral peripheral teeth which are engaged by an indexing assembly for movement of the carrier and which engage the pinion of an optical compensator at the gate station to correct for movement and/or displacement of the image element with respect to the gate station or optical system of the projector.

A still further object of the invention is the provision of a projection apparatus having four gate stations and illuminating and optical systems and comprising a pair of image carriers each carrying at least two series of image elements, a pair of indexing assemblies for each image carrier, four shutter assemblies for each gate station and optical system, an optical compensator at each gate station, a common driving means for said indexing assemblies and shutter assemblies, and control means associated with the respective indexing assemblies and supervised by said driving means so that one image carrier may be indexed during the projection of pictures through the image elements on the other image carrier, both image carriers being momentarily stationary during the dissolving of the image from one carrier onto an image on the other carrier.

Still another object of the invention is the provision of an adjustable connection between one end of the spring members in the indexing assemblies and a driving or driven part therefor for adjustment of the relative tensioning of the spring member and balancing of the forces exerted thereby.

Other and further objects of the invention will be suggested to those skilled in the art by the description which follows.

The above and other objects of the invention are embodied in a photographic projection apparatus having at least two gate stations and two image carriers, in combination with a pair of indexing assemblies co-operatively arranged and each comprising a driven member operatively connected to the respective image carrier, a driving member, a spring member connected between said driving and driven members, and an escapement engaging said driven member with an image element on the corresponding image carrier in the gate station, while said driving member tensions the intervening spring member, said spring members each having a period such that when tensioned the image carrier is moved and then brought to rest by reverse tensioning of said spring member and an energy transmitting connection between said indexing assemblies for transferring the energy received by one spring member from its corresponding image carrier to the other spring member to tension it for movement of the other image carrier. According to the invention, the image carriers are preferably circular and carry integral peripheral teeth operatively connected to the respective indexing assemblies and for operating an optical compensator. Finally, the invention contemplates a four-phase two-cycle projector in which the four shutter assemblies are successively opened and closed and in which one image carrier is indexed while the image elements on the other image carrier are being projected.

Reference is hereby made to the accompanying drawings wherein similar reference characters designate similar elements and wherein:

Fig. 2 is a front elevation of said projection apparatus and particularly showing the shutter system therefor.

Fig. 5 is a fragmentary radial section through the image carrier showing the mounting means therefor and taken on the line 5—5 of Fig. 1.

Fig. 6 is a fragmentary plan view of the lateral guide rollers shown in Fig. 5.

Fig. 7 is a horizontal section through the driving connections for a shutter assembly.

Fig. 8 is a substantially horizontal section through the housing for the pair of indexing assemblies.

Fig. 9 is a substantially vertical section through said housing for the indexing assemblies.

Fig. 10 is a vertical section through the indexing housing taken on the line 10—10 of Fig. 9.

Fig. 11 is an axial section through an indexing spring taken on the line 11—11 of Fig. 8.

Fig. 12 is an end view of an adjustable connector for the spring member as seen from the cutting plane 12—12 of Fig. 11.

Fig. 13 is a fragmentary plan view to enlarged scale of the adjustable connection for one end of the indexing spring member.

Fig. 14 is a skeleton perspective of the pair of indexing assemblies and associated control members.

Fig. 15 is a transverse cross section through the indexing housing taken on the line 15—15 of Fig. 8.

Fig. 16 is a fragmentary section through said housing taken on the line 16—16 of Fig. 15.

Fig. 17 is a plan view of a jig for mounting image elements onto the image carriers, and Fig. 18 is an end view of such a jig in position on the image carrier and locating a slide holder.

Figure 1:
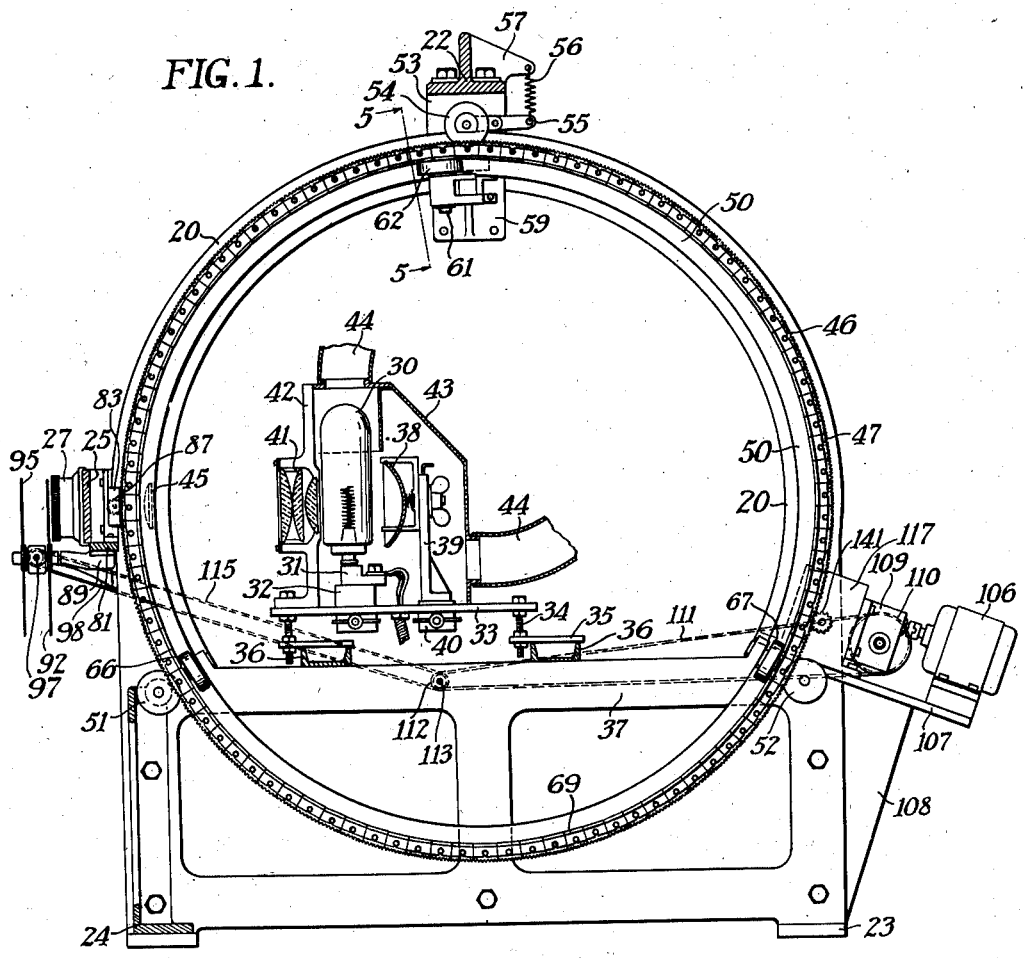
Fig. 1 is a vertical longitudinal section of the projection apparatus according to the invention.
Figure 3:
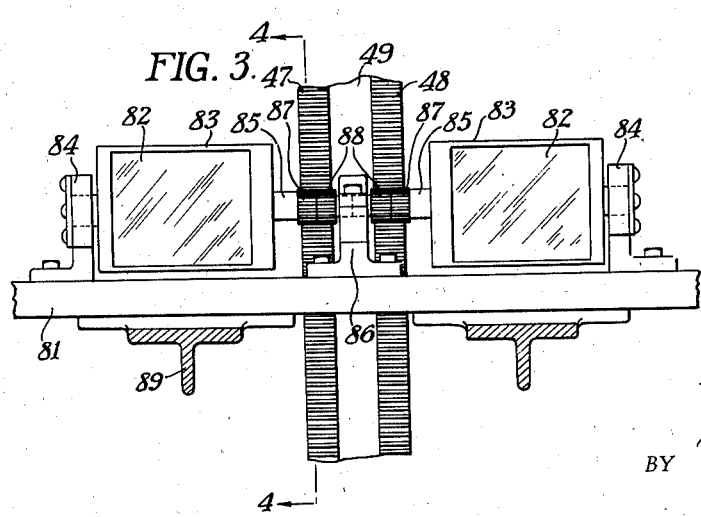
Fig. 3 is a fragmentary front view of the optical compensators for an image carrier.
Figure 4:
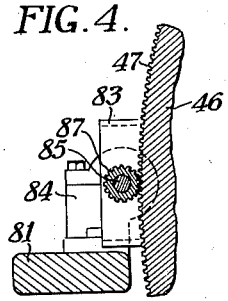
Fig. 4 is a transverse section through the drive for an optical compensator taken on the line 4—4 of Fig. 3.

The illustrated embodiment of our invention relates to a projection apparatus having two image carriers and two series of image elements on each carrier. However, it is to be understood that the present invention is equally applicable to projection apparatus having only a single series of image elements on each of the image carriers or having more than two series of image elements on each image carrier. Indexing assemblies of the invention are shown herein in pairs but it is to be understood that two or more pairs of indexing assemblies may be similarly arranged to obtain the same advantages or transfer energy from one spring member to another.

The projection apparatus of the invention comprises a frame member having side frames 20 and 21, an upper cross member 22, a lower cross member 23 and a front cross frame 24. A front cross bar 25 is bolted at each end to the side frames 20 and 21 and carries four projection lens assemblies 26, 27, 28 and 29.

An illuminating system is in alignment with each projection lens assembly and each comprises an incandescent lamp 30 supported by a holder 31 adjustably mounted by a clamp 32 on a platform 33 which is supported by bolts 34 and brackets 35 from cross channels 36 on intermediate braces 37 of the side frames. A spherical mirror 38 is adjustably mounted on a bracket 39 fastened to platform 33 by a clamp 40 and reflects the light from lamp 30 through a condenser system 41 mounted in a frame member 42 on said platform 33. A lamp housing 43 is also mounted on platform 33 and encloses said incandescent lamp 30 and mirror 38. Air blast connections 44 are attached to said lamp housing 43 for circulating cool air therethrough.

The illuminating and optical system for each gate station of the projection apparatus may in addition to the lamp 30, mirror 38, condenser system 41 and projection lens assemblies already mentioned include a field lens 45 indicated by dotted lines in Fig. 1 and appropriately mounted on the frame of the apparatus.

A pair of image carriers are movably supported by said frame and each preferably comprises a circular ring 46 having two rows of teeth 47 and 48 integral with said ring 46 and separated by an annular groove 49. Said circular ring 46 also includes an internal guiding flange 50 and has lateral sides upon which series of image elements are mounted in a manner to be described.

Each image carrier is mounted for rotation on the projector frame by means of a plurality of roller assemblies. For instance, ball-bearing rollers 51 are rotatably mounted on said front cross frame 24 and are located to engage the annular groove 49 of each image carrier. Similar rollers 52 are mounted on the frame at the rear thereof and also engage said annular groove 49. While rollers 51 and 52 are stationary and support the weight of the image carrier, it is desirable to provide a third spring pressed roller at the top of the frame. A plate 53 extends downwardly from the upper cross member 22 and a ball-bearing roller 54 is mounted on one end of a bell crank 55 intermediately pivoted to said plate 53. A spring 56 has one end connected to a bracket 57 on cross member 22 and has its other end connected to the other end of bell crank 55 whereby said roller 54 is spring pressed into the annular groove 49 of the image carrier. An arm 60 is pivotally mounted between a bifurcated end 59' of bracket 59 by means of a bolt 61 and carries a ball-bearing roller 62 on one end thereof. The roller 58 is in rolling engagement with one side of guiding flange 50 and the roller 62 is resiliently held in rolling engagement with the other side of flange 50 by means of a spring 63 having one end attached to bracket 59 and the other end attached to arm 60. The other end of arm 60 carries an adjustable set screw 64 for engaging a shoulder 65 of bracket 59 and limiting the movement of roller 62 away from roller 58. In like manner lateral guiding assemblies are provided adjacent each of the lateral or peripheral guiding assemblies. For instance, a pair of lateral guide rollers is mounted near the ball-bearing roller 51, only the roller 66 of that pair being shown. Also, a pair of guide rollers is mounted adjacent each of the rollers 52, only the roller 67 thereof being shown, see Fig. 1.

It is now evident that each of the image carriers is rotatably mounted for centerless movement and if for any reason the rings 46 become warped or distorted the lateral and radial or peripheral guide rollers will support the rings 46 accurately within each of the gate stations and accurately with respect to each of the indexing assemblies. Such mounting of the image carriers is of great practical advantage because of the difficulty of maintaining reasonable accuracy in a circular ring of the dimensions contemplated.

The manner of mounting the image elements upon the image carriers will now be described. The image elements 68 are cemented to glass slides 69 and accurately mounted between the plane portion of a projector holder 70 and a clamp plate 71 and held in place by a screw 72 and cemented bonds, not shown, but all fully described and disclosed in the copending application of Koch and Tuttle, Serial No. 349,584, filed August 2, 1940, for Transparency slide-projector holder and method and apparatus for assembling the same. Said projector holders 70 also include shoulders 73 which are accurately fitted and held against the lateral side of circular ring 46 by screws 74. Said shoulders 73 are provided with slots 75 and are slightly counter-sunk to receive the heads of screws 74.

All of the projector holders 70 may be loosely fastened to the sides of circular ring 46 and prior to tightening of screws 74 the projector holders are accurately positioned by means of a jig. Such a jig may comprise a block 76 carrying a pair of teeth 77, the surface of block 76 between said teeth 77 being concave to correspond to the curvature of the circular ring 46 or a row of teeth 47 or 48 thereon. A guide plate 78 is fastened to one side of block 76 by a screw 79 and has a tongue 80 for extending into a slot 75 of a projector holder 70 to locate the same with extreme accuracy circumferentially of the circular ring 46 with respect to the rows of teeth 47 and 48 thereon. As shown, the block 76 is wide enough to extend over both rows of teeth 47 and 48 while locating the projector holder 70 or shoulder 73 thereof just before the screw 74 is finally tightened.

By reason of such precise and predetermined positioning of the image or projector holder with respect to the teeth of the image carrier, the optical compensators at the gate station may function independently of other variables to correct the registry of the image element in the gate station. Such optical compensators are mounted in alignment with each gate station on a cross ledge 81 along the bottom of front cross bar 25. For instance, a plane-parallel glass plate 82 is mounted in a frame 83 which is journaled at one end in a bearing 84 on cross ledge 81 and which at the other end has a central shaft 85 supported by a double bearing 86 on said ledge 81. A pinion 87 is attached to shaft 85 and a pinion 88 is rotatably mounted on shaft 85 for movement by a torsion spring, not shown, but fully described in character and action in our aforementioned copending application. Pinions 87 and 88 both mesh with the row of teeth 47 to eliminate any back lash in such engagement. The optical compensator for the other series of image elements on the same image carrier is similarly constructed and has an anti-back lash connection to the row of teeth 48 including pinion gears 87 and 88. The ends of the shafts 85 of the two compensators in a pair are both journaled in bearing 86 and abut each other.

A plurality of shutter assemblies are provided, one for each gate station of the projection machine. Each shutter assembly is mounted upon a bracket 89 fastened to the under-surface of cross ledge 81. A shaft 90 extends from bracket 89 and has a square portion 91. A shutter blade 92 is fastened to a sleeve 93 which is supported for free rotation on shaft 90 by means of a ball-bearing collar 94. A shutter blade 95 is fastened to a sleeve 96 mounted for rotation on the outer end of the shaft 90 by a ball-bearing collar 96'. A transverse shaft 97 is rotatably mounted at opposite ends on the front of the machine by a pair of bearing brackets 98 and 99 respectively fastened to side frames 20 and 21 and said shaft 97 passes through openings in the square portions 91 of the several shafts 90. U-shaped brackets 100 are fastened to each square portion 91 and carry at its opposite ends ball-bearing collars 101 and 102 whereby the transverse shaft 97 is supported at intervals across the machine. A miter gear 103 is pinned to the shaft 97 at each shutter assembly and meshes with a miter gear 104 attached to sleeve 93 and also meshes with a meter gear 105 attached to the sleeve 96. As the shaft 97 rotates the miter gear 103 causes rotation of the miter gear 104 and associated shutter blade 92 in one direction while the other miter gear 105 and its associated shutter blade 94 rotate in the opposite direction.

The shutter blades of the various assemblies are each provided with a sector opening such that as the blades 92 and 95 revolve the projection lens assembly, such as projection lens 26 is covered by closing of the shutter blades from opposite sides and remains covered until the relative positions of blades 92 and 95 illustrated in front of projection lens 27 are obtained. As shown in Fig. 2 the shutter blades 92 and 95 in front of lens 27 are about to open from the center and uncover said lens 27. The other shutter blades in front of the other projection systems are shown in closed position but at varying points of the cycle such that the blades in front of lens 28 open just as the blades in front of lens 27 are being closed, while the blades in front of lens 29 are being opened just as the blades in front of lens 28 are being closed. In other words, the shutter assemblies consisting of the four sets of blades 92 and 95 are relatively arranged so that the projection assemblies are successively uncovered and are preferably arranged for cross-dissolve from one projection system to the other in which case the set of blades for the preceding projection are being closed as the set of blades for the succeeding projection are being opened. These conditions are readily obtained by proper relative rotation of the shutter blades 92 and 95 and by proper selection of the sector openings therein.

An electric motor 106 is mounted on a shelf 107 attached to the rear of the projector frame by a brace 108. Said motor 106 is directly connected to a reduction gear 109 having a pulley 110 on its output shaft. A belt 111 encircles pulley 110 and a pulley 112 mounted on one end of a shaft 113 journaled in and extending through the side frame 20. A pulley 114 is mounted on the other end of pulley shaft 113 and is encircled by a belt 115 which also encircles a pulley 116 on the end of transfer shaft 97. Thus, upon operation of the motor 106 the several shutter assemblies are operated for successive opening and closing thereof.

The indexing assembly for the pair of image carriers, according to the invention, is of outstanding advantage because it includes spring members arranged to reduce the peak torque required by the driving motor. Such even distribution of the load on the index motor is obtained by providing a spring member in each of the indexing assemblies for the respective image carriers and selecting a spring period such that the image carrier is first moved by the tensioned spring member and is then brought to rest by reverse tensioning of the spring member, such reverse tensioning being transmitted to the other spring member to assist in its tensioning for movement of the other image carrier.

One specific form of such indexing assembly is illustrated in Figs. 8 to 16, inclusive. An indexer housing 117 is also mounted on the shelf 107 and encloses a central gear housing 118. The shaft 119 is directly connected to the motor 106 and carries a worm 120. A worm wheel 121 is mounted upon a transverse shaft 122 journaled in ball races 123 in opposite walls of the gear housing 118. The shaft 119 is also journaled in ball races 124 in said gear housing 118.

One of the indexing assemblies comprises a driven member operatively connected to the image carrier or more specifically consists of a pinion gear 125 meshing with the rows of teeth 47 and 48 and circular ring 46 and mounted upon a shaft 126 which is journaled at opposite ends in ball races 127 on a bracket 128 attached to the end of indexor housing 117. A double toothed cam escapement 129 is fastened to the end of shaft 126 within the housing 117. A spring member 130 has one end fastened to a connector 131 which is bolted to the cam escapement 129. The other end of spring 130 is fastened to a connector 132 which is bolted to an adjustable connector 133. Said adjustable connector 133 is fastened to a driving member 134 which carries a pair of control members or opposite rises 135, see Figs. 10 and 14. Said driving member 134 is directly connected to one end of the transverse shaft 122. An escapement arm 136 normally engages the double toothed cam plate 129 to hold said pinion 125 in a position with an image element on the carrier in alignment with the gate station. Said escapement arm is fastened to a shaft 137 journaled in a block 138 within housing 117. A control arm 139 carries a roller 140 for engaging the periphery of driving member 134 and being attached to the other end of shaft 137. As a result, when a rise 135 passes the roller 140 control arm 139 and escapement arm 136 are moved so that the driven plate 129 is free to be moved. Prior to such disengagement of the escapement, the spring member 130 was being tensioned by the rotation of driving member 134.

The other indexing assembly comprises a pinion 141, see Fig. 1, arranged in a manner similar to pinion 125 to engage the two rows of gear teeth on the other image carrier. Such pinion 141 is attached to the end of a shaft 142 journaled in the end of housing 117 and affixed to a double toothed escapement plate 143. A spring member 144 has one end attached to a connector 145 bolted to plate 143 and has its other end attached to a connector 146 bolted to an adjustable connector 147 which in turn is fastened, in a manner to be described, to the driving member 148 which is fastened by a key 149 to the other end of transverse shaft 122.

The connectors 131, 132, 145 and 146 are illustrated in more detail in Figs. 11, 12 and 13. Each of these connectors comprises a fixed plate 150 carrying a pair of jaws 151 and 152 and a pair of jaws 153 and 154 at the opposite end thereof. The end of the spring member such as the end 144' of the spring member 144 is inserted between the two pairs of jaws 151 and 152, 153 and 154 and is welded only to the jaws 153 and 154. This type of connection has been found to be of great advantage in that the ends of the spring members may be securely fastened to the other members without unreasonable fatigue in restricted areas of the springs and premature braking thereof.

In view of the balancing and transmission of forces within and between the indexing assembly, it is necessary accurately to adjust the spring members with respect to the driving and driven members to which they are connected. For this purpose adjustable connectors 133 and 147 are placed between one end of each of the spring members 130 and 144 and the respective driving members 134 and 148. Such an adjustable connector may comprise a threaded sleeve 155 on the driving member 148. A split ring 156 is internally threaded for engagement with the threaded sleeve 155 and a bolt 157, provided in its head with a wrench recess 158, extends through one part of split ring 156 and is threaded into the other half thereof. Thus by merely loosening the bolt 157, the split ring 156 may be threaded for adjustment with respect to the threaded sleeve 155. When the proper adjustment has been obtained the bolt 157 is again tightened.

An escapement arm 159 is mounted on one end of a shaft 160 journaled in a block 161 in housing 117 and is normally in engagement with a tooth of the escapement plate 143. An arm 162 rides against the periphery of driving member 148 which has a pair or rises 163 adapted to operate a roller 164 on arm 162 and to cause dis-engagement of escapement arm 159 from escapement plate 143.

The escapement arm 136 and control arm 139 are normally held in engagement with the respective escapement plate 129 and driving member 134 and the escapement arm 159 and control arm 162 are also held normally in engagement with the respective escapement plate 143 and driving member 148 such as by a coil spring 165, see Fig. 15, having one end attached to the escapement arm and the other end attached to a wall of the index housing 117.

As explained in detail in our copending application, Serial No. 350,006, filed August 2, 1940, for Automatic control system for photographic projectors, the automatic control for the projection apparatus herein disclosed includes a limit switch operated in timed relation to the movement of the respective indexing assemblies. Such limit switches may comprise a Microswitch 166 mounted upon a end wall of housing 117 and having a plunger 167. An arm 168 is intermediately pivoted on housing 117 by a bolt 169, carries a pin 170 opposite said plunger 167, and has its other end connected to one end of a coil spring 171 which has its other end attached to the housing 117. A bar 172 is pivoted at its lower end to the escapement arm 159, has a lip 173 through which a set screw 174 is threaded, and is provided with an elongated slot 175 through which a screw 176 extends and into the arm 168. The movement of escapement arm 159, bar 172, and arm 168 to retract the pin 170 and permit plunger 167 to move to open the switch 166 may be very accurately adjusted by movement of set screw 174. In a similar manner a switch 177 having a plunger 178 is operated by movement of the other escapment arm 136. An arm 179 having a pin 180 is spring pressed so that pin 180 normally operates the switch plunger 178, a bar 181 being connected between escapement arm 136 and arm 179 and being adjustable with respect to arm 179 by means of a set screw 182.

The operation and co-operation of the indexing assemblies will now be described. Referring to Fig. 14 it will be noted that the escapement arm 136 is about to be dis-engaged from the escapement plate 129 as soon as the summit of rise 135 makes contact with the roller 140. At this time both image carriers are stationary and the shutter assemblies in front of projection lenses 27 and 28 are being cross-dissolved to close the shutter in front of lens 27 and to open the shutter in front of lens 28. Also spring member 130 has been tensioned practically to the amount necessary to drive the image carrier. Worm 120 and worm 121 are being continuously rotated in the direction of the arrow on worm wheel 121. As a result, the rise on driving member 134 soon moves roller 140, control arm 139 and escapement arm 136 so that said escapement arm dis-engages the tooth of escapement plate 129. Dis-engagement of the escapement releases the tensioned spring member 130 to exert its potential energy and revolve shaft 126, pinion 125 and the associated image carrier. At the same time the worm wheel 121 and driving member 124 continue to rotate so that the movement of the image carrier is the sum of the movement on account of the tension in spring member 130 and the movement of the worm wheel 121. The period and arrangement of spring member 130 is such that the spring member reaches an untensioned condition at about the middle of the indexing movement of the image carrier whereupon the image carrier runs ahead of the spring member and associated driving member 134 so that said spring member 130 is tensioned in the opposite direction. The spring 130 opposes such opposite tensioning and receives or absorbs the kinetic energy of the image carrier and related parts to bring the image carrier to rest just as another image element is placed in the gate station and just as the escapement arm 136 engages the other tooth of the escapement plate 129. As a result, the heavy image carrier is efficiently and quietly indexed.

During this time the driving member 148 was also rotating and winding up the spring member 144 for indexing of the other image carrier when the escapement plate 143 is released by escapement arm 159. Obviously, the last part of the tensioning of either spring member, in this case such as the final tensioning of spring member 144, places or tends to place the greatest load on the indexing motors. However, as soon as the reverse tension is set up in the spring member 130 by its opposing the movement of the image carrier such energy is transferred through the common driving connection or through driving member 134, shaft 122 and driving member 148 to the spring member 144. In fact, in a frictionless system the energy received by the spring 130 from the image carrier would be sufficient to tension the spring member 144 for indexing of the other carrier but due to friction losses, the energy transferred from spring member 130 to spring member 144 must be supplemented by the indexing motor. Nevertheless, the load on the indexing motor is evenly distributed because at the time of an otherwise peak load the spring member 130 is transferring its energy due to reverse tensioning to the spring member 144.

As before explained, there is a brief moment when both escapement plates 129 and 143 are held stationary, as for instance, when the shutter assembly in front of projection lens 29 is being closed and the shutter assembly in front of projection lens 26 is being opened. Immediately thereafter escapement plate 143 is dis-engaged by escapement arm 159, spring member 114 is released for indexing of the image carrier, is then reversely tensioned and transfers such energy back to the other spring member 130. These cycles and transfers of energy may continue throughout the operation of the machine.

On account of the irreversible characteristic of a worm 120 and worm wheel 121, the transfer of energy from one spring member to the other does not take place immediately. In other words, when spring member 130 is reversely tensioned it tends to rotate the worm wheel 121 in the direction of the arrow but the worm 120 does not permit the movement of worm wheel 121 except at the speed of the indexing motor or rotation of shaft 119. As a result, said worm 120 and worm wheel 121 act in the nature of a governor for the transfer of such energy and because of such governing action by the worm and worm wheel, the last of the energy in spring 130 on account of its reverse tension is not delivered to the spring 144 until it is reaching its fully tensioned position which condition would place a peak load on the motor except for the assistance given by the energy from the spring 130. It should be understood, however, that a known form of over-running drive could be used to rotate the shaft 122 whereupon the energy imparted to spring 130 by the image carrier could be immediately transferred to the other spring member 144. The foregoing description contemplates transfer of energy from member 130 to spring member 144 but it will be understood by those skilled in the art that during the next cycle spring member 144 is reversely tensioned and transfers its energy back to the spring 130. Thus, in effect a torsion-pendulum system is provided and by reason of the transfer of energy from the spring member to the image carrier, then from the image carrier back to the spring member, and finally from one spring member to the other, it is necessary only for the motor 106 to supply the friction losses in the system so that the peak load on the indexing motor is reduced and a lower rating motor may be used.

Since many modifications of the constructions shown herein are possible without deviating from the spirit of the invention, the present disclosure is to be construed in an illustrative sense and the scope of the invention is defined in the claims which follow.

Having now particularly described our invention what we desire to secure by Letters Patent of the United States and what we claim is:

1. In a projection apparatus having four gate stations, the combination with an illuminating and optical system in alignment with each gate station, a pair of image carriers each having two rows of integral gear teeth and each carrying two series of image elements in precise predetermined relation to the teeth of the corresponding row for movement into the respective gate stations, and a pair of indexing assemblies each including a pinion meshing with the teeth of one of said image carriers for moving the same and the image elements thereon into and out of said gate stations, of four shutter assemblies each one of which is in alignment with one of said gate stations and all of which are opened and closed successively, an optical compensator in alignment with each gate station and each operatively connected to a row of teeth on said image carrier, a driving means connected to said indexing assemblies and to said shutter assemblies, and a pair of escapements associated with respective indexing assemblies, supervised by said driving means, and for alternateively rendering one of said indexing assemblies inoperative to hold one image carrier stationary while the shutter assemblies associated with the image elements thereon are being opened and while the other image carrier is being indexed.

2. In a projection apparatus having four gate stations, the combination with an illuminating and optical system in alignment with each gate station, a pair of image carriers each carrying two series of image elements for movement into respective gate stations, and a pair of indexing assemblies each operatively connected to one of said image carriers for moving the image elements thereon into and out of said gate stations, of four shutter assemblies each one of which is in alignment with one of said gate stations and all of which are timed to be opened and closed successively, a driving means connected to said indexing assemblies and to said shutter assemblies, and a pair of control members associated with respective indexing assemblies, normally engaging said indexing assemblies to render them inoperative, and alternatively disengaged in timed relation to said shutter assemblies so that one image carrier is being indexed while the shutter assemblies associated with the illuminating and optical systems passing through the image elements on the other image carrier are being opened.

3. In a projection apparatus having four gate stations, the combination with an illuminating and optical system in alignment with each gate station, a pair of image carriers each having at least one row of integral peripheral gear teeth and carrying two series of image elements in precise predetermined relation to said gear teeth and movable into the respective gate stations, and a pair of indexing assemblies each including a pinion meshing with the teeth of one of said image carriers for moving the same and the image elements thereon into and out of said gate stations, of an optical compensator including a transparent plate in alignment with each gate station and each operatively connected to a row of teeth on said image carrier, a driving means connected to said indexing assemblies, and a pair of escapements associated with respective indexing assemblies, supervised by said driving means, and for alternatively rendering one of said indexing assemblies inoperative to stop one image carrier with said image elements and the transparent plates of the corresponding optical compensators in substantially parallel relation.

4. In a projection apparatus having a pair of gate stations, the combination with an image carrier having two peripheral rims and two peripheral rows of gear teeth, and two series of individual image elements on each rim in precise predetermined relation to the teeth of the respective rows, and an indexing means including a pinion gear meshing with one of said rows of teeth and for intermittently moving said image carrier and an image element in each series thereon into the respective gate station, of an optical compensator in alignment with each gate station, operatively connected to said image carrier through the peripheral teeth thereon, and correcting for any movement and/or displacement of said image elements with respect to respective gate stations.

5. In a projection apparatus having a gate station, the combination with an image carrier having a row of gear teeth and carrying a plurality of image elements mounted on said carrier in precise relation to certain of said gear teeth, and an indexing means including a pinion gear meshing with said gear teeth and for moving said image carrier to move each of said image elements into said gate station, of an optical compensator in alignment with said gate station, and a pinion gear on said compensator and also in engagement with said row of gear teeth on said carrier and for operating said compensator to correct for any movement and/or displacement of said image carrier with respect to said gate station.

6. In a projection apparatus having a gate station, the combination with a circular image carrier having a peripheral and integral row of gear teeth and carrying a plurality of separate image elements mounted around the periphery of said carrier in precise relation to said gear teeth, of an optical compensator including a plane-parallel transparent plate rotatably mounted in alignment with said gate station, and a pinion gear on said compensator in engagement with the teeth on said image carrier and for operating said plate to correct for any movement or displacement of the image element with respect to said gate station.

7. In a projection apparatus having at least two gate stations, the combination with a pair of image carriers each carrying a series of image elements for movement into and out of said gate stations, of a pair of indexing assemblies each operatively connected to a respective image carrier, alternatively operative to move one image carrier and then the other, and each including a spring member adapted and arranged to be tensioned and to impart its energy to one of said image carriers to move the same, having a period such as to receive energy by opposing movement of said carrier and arranged to impart the energy so received to the other spring member of the other indexing assembly.

8. In a projection apparatus having at least two gate stations, the combination with a pair of image carriers each carrying a series of image elements which are movable into respective gate stations, of a pair of indexing assemblies each comprising a driven member operatively connected to a respective image carrier, a driving member, and a spring member connected between said driving and driven members, adapted upon being tensioned by said driving member to move one image carrier, and adapted to oppose movement of the image carrier by being oppositely tensioned thereby, and an energy transmitting connection between said indexing assemblies for transferring the energy received by one spring member from said one image carrier to the other spring member to tension it for movement of the other image carrier.

9. In a projection apparatus having at least two gate stations, the combination with a pair of image carriers each carrying a series of image elements for movement into and out of said gate stations, of a pair of indexing assemblies having a common driving member and each comprising a driven member operatively connected to a respective image carrier and a spring member connected between said driving and driven members for imparting energy to the image carrier to move the same and having a period such as to receive energy therefrom to stop said carrier, the energy received from the carrier by one spring member being transmitted to the other spring member through said common driving member.

10. In a projection apparatus having at least two gate stations, the combination with a pair of image carriers each carrying a series of image elements which are movable into respective gate stations, of a pair of indexing assemblies coaxially arranged and each comprising a driven member operatively connected to a respective image carrier, a driving member, and a spring member connected between said driving and driven members, adapted upon being tensioned by said driving member to move one image carrier, and having a period such as to oppose movement of the image carrier by being oppositely tensioned thereby, a shaft connected between said driving member for transferring the energy received by one spring member from said one image carrier to the other spring member to tension it for movement of the other image carrier.

11. In a projection apparatus having at least two gate stations, the combination with a pair of image carriers each carrying a series of image elements which are movable into respective gate stations, of a pair of indexing assemblies each comprising a driven member operatively connected to a respective image carrier, a driving member, a spring member connected between said driving and driven members, and an escapement engaging said driven member with an image element on the corresponding image carrier in the gate station while said driving member tensions the intervening spring member, said spring members each having a period so that when tensioned the image carrier is moved and then brought to rest by reverse tensioning of said spring member, control means operatively arranged with respect to said escapement and for alternatively disengaging the same, and a shaft connected between said driving member for transferring the energy received by one spring member from said one image carrier to the other spring member to tension it for movement of the other image carrier.

12. In a projection apparatus having at least two gate stations, the combination with a pair of image carriers each carrying a series of image elements which are movable into respective gate stations, of a pair of indexing assemblies each comprising a driven member operatively connected to a respective image carrier, a driving member, and a spring member connected between said driving and driven members, adapted upon being tensioned by said driving member to move one image carrier, and adapted to oppose movement of the image carrier by being oppositely tensioned thereby, a shaft connected between said driving members for transferring the energy received by one spring member from said one image carrier to the other spring member to tension it for movement of the other image carrier, and a drive means to said shaft and for controlling the transfer of energy from one spring member to the other.

13. In a projection apparatus having at least two gate stations, the combination with a pair of image carriers each carrying a series of image elements which are movable into respective gate stations, of a pair of indexing assemblies each comprising a driven member operatively connected to a respective image carrier, a driving member, and a spring member connected between said driving and driven members, adapted upon being tensioned by said driving member to move one image carrier, and adapted to oppose movement of the image carrier by being oppositely tensioned thereby, a shaft connected between said driving members for transferring the energy received by one spring member from said one image carrier to the other spring member to tension it for movement of the other image carrier, a worm wheel on said shaft, and a power drive including a worm in engagement with said worm wheel.

14. In a projection apparatus having at least two gate stations, the combination with a pair of image carriers each carrying a series of image elements for movement into and out of said gate stations, of a pair of indexing assemblies having a common driving member and each comprising a driven member operatively connected to a respective image carrier, a spring member connected between said driving and driven members, and escapements holding said driven members with an image element in the gate stations while said spring member is being tensioned, and a control member movable with said driving member and for releasing said escapement, the control members of the respective assemblies being timed alternatively to release the corresponding escapement, said spring members each having a period such that, upon release of the escapement, the image carrier is first moved by the energy stored in the tensioned spring member and is then brought to rest by the opposition of said spring member which is then tensioned in the opposite direction and which gives up such energy to the other spring member through said common driving member.

15. In a projection apparatus having at least two gate stations, the combination with a pair of image carriers each carrying a series of image elements for movement into respective gate stations, of a pair of indexing assemblies coaxially arranged, having a common driving shaft, and each comprising a driven member operatively connected to a respective image carrier, a driving member on said shaft, a spring member connected between said driving and driven members, and escapements holding said driven members with an image element in the gate station while said spring member is being tensioned, and a control member movable with said driving member and for releasing said escapement, the control members in respective indexing assemblies being angularly displaced alternatively to release said driven members, said spring members each having a period such that, upon release of one escapement, the corresponding image carrier is first moved by the tension in the respective spring member, is then retarded by tensioning thereof in the opposite direction, and finally transmits such energy through said shaft to the other spring member while the other driven member is held against movement by the other escapement.

16. An indexing assembly for a photographic projection apparatus comprising a driven member, a driving member, a coil spring therebetween, a connection between one end of said coil spring and one of said members and adjustable with respect to said member to vary the tension in said coil spring, and a clamping means on said connection for securing it in an adjusted position.

17. An indexing assembly for a photographic projection apparatus comprising a driven member, a driving member, a coil spring therebetween, an adjustable connection between one end of said spring and one of said members and including a connector attached to the end of said spring and having a threaded portion engaging and movable with respect to a threaded portion on one of said members to vary the tension in said spring, and a clamping means on said connection and for securing said threaded portion in an adjusted position with respect to said member.

18. An indexing assembly for a photographic projection apparatus comprising a driven member, a driving member, a coil spring therebetween, and a connector between at least one end of said spring and one of said members and including two angularly spaced jaws, the arcuate end portion of said coil spring extending through one of said jaws and being attached to the other jaw.

19. An image carrier for a photographic projector comprising a circular ring member having lateral sides both adapted to support a series of image elements, and having at least one row of peripheral and integral gear teeth.

20. An image carrier for a photographic projector comprising a ring member provided with a peripheral guiding groove, a peripheral row of teeth on each side of said groove and integral with said ring member, and an internal guiding flange, both sides of said ring member being adapted to support image elements.

FORDYCE TUTTLE.
ALBERT B. FULLER.